(12) United States Patent
Ringer (10) Patent No.: US 12,336,543 B1
(45) Date of Patent: Jun. 24, 2025

(54) SPRING LOADED WAFER CUTTER

(71) Applicant: Adam Ringer, Bethel Park, PA (US)

(72) Inventor: Adam Ringer, Bethel Park, PA (US)

(*) Notice: Subject to any disclaimer, the term of this patent is extended or adjusted under 35 U.S.C. 154(b) by 0 days.

(21) Appl. No.: 18/814,798

(22) Filed: Aug. 26, 2024

(51) Int. Cl.
*A21C 11/10* (2006.01)
*A21C 11/12* (2006.01)

(52) U.S. Cl.
CPC ............ *A21C 11/106* (2013.01); *A21C 11/12* (2013.01)

(58) Field of Classification Search
CPC ..... A21C 11/12; A21C 11/106; A21C 11/006; A21C 11/10
USPC .................................. 99/932, 450.2
See application file for complete search history.

(56) References Cited

U.S. PATENT DOCUMENTS

| | | | | |
|---|---|---|---|---|
| 230,294 A * | 7/1880 | Lincoln | ............. | B26B 13/22 |
| | | | | D7/672 |
| 1,859,762 A * | 5/1932 | Blum | ............. | A21C 5/08 |
| | | | | 425/300 |
| 2,008,725 A * | 7/1935 | Parker | ............. | A22C 7/0076 |
| | | | | D7/672 |
| 2,346,242 A * | 4/1944 | Turner | ............. | A21C 11/10 |
| | | | | 30/301 |
| 2,618,227 A * | 11/1952 | Schmittroth | ............. | A21C 5/08 |
| | | | | 425/300 |
| 2,837,761 A * | 6/1958 | Stiegler | ............. | A22C 7/00 |
| | | | | D7/672 |
| 2,994,286 A * | 8/1961 | Mussari, Jr. | ............. | A21B 3/13 |
| | | | | 249/115 |
| 3,279,397 A | 10/1966 | Swett et al. | | |
| 3,828,660 A | 8/1974 | Mueller et al. | | |
| 4,138,768 A * | 2/1979 | Roth | ............. | A22C 7/0076 |
| | | | | 425/382.3 |
| 4,192,899 A * | 3/1980 | Roth | ............. | A22C 7/00 |
| | | | | 426/503 |
| 4,572,444 A * | 2/1986 | Shadduck | ............. | B26B 5/008 |
| | | | | 30/301 |
| 4,765,029 A * | 8/1988 | Rogan | ............. | A22C 7/00 |
| | | | | 425/444 |
| 5,112,634 A * | 5/1992 | Swearingen | ............. | A22C 7/00 |
| | | | | 100/910 |
| 5,731,020 A | 3/1998 | Russo | | |
| D401,482 S * | 11/1998 | De Are | ............. | D7/677 |
| 5,832,800 A * | 11/1998 | Donoghue | ............. | A21C 15/04 |
| | | | | 83/762 |
| 6,386,854 B1 | 5/2002 | Guss | | |
| 6,851,192 B2 | 2/2005 | So | | |
| 7,331,776 B2 * | 2/2008 | Errera | ............. | A21C 11/02 |
| | | | | 52/223.13 |
| 8,202,073 B1 * | 6/2012 | Kovalevich | ............. | A47J 43/20 |
| | | | | 425/355 |

(Continued)

*Primary Examiner* — Emmanuel S Luk
(74) *Attorney, Agent, or Firm* — Gugliotta & Gugliotta LPA (57) ABSTRACT

A pastry cutter is provided to efficiently cut individual wafers from rolled dough. It features a detachable head and handle, allowing the head to press into the dough to create wafers while simultaneously perforating them with a grid of spikes. The head enclosure includes a cutter edge for defining the wafer shape and cleanout apertures for easy maintenance. An internal dough pusher, aided by springs, ejects the cut wafers from the head to ensure they do not stick. The design aims to streamline the production of wafer cookies or similar thin pastries by combining cutting, perforating, and ejecting functions in a single tool.

15 Claims, 7 Drawing Sheets

(56) References Cited

U.S. PATENT DOCUMENTS

| | | | | |
|---|---|---|---|---|
| D680,819 S * | 4/2013 | Patel | ............................. | D7/676 |
| 8,458,814 B1 | 6/2013 | Voto | | |
| 8,926,306 B2 * | 1/2015 | Harrison | ................. | A47J 43/20 |
| | | | | 425/278 |
| 8,936,461 B2 * | 1/2015 | Palazzolo | .............. | A21C 11/04 |
| | | | | 425/436 RM |
| 9,504,259 B2 * | 11/2016 | White | .................... | B26D 11/00 |
| 10,842,319 B2 * | 11/2020 | Cohen | ..................... | A21D 13/43 |
| 11,305,450 B2 * | 4/2022 | Hauser | ..................... | B26D 3/283 |
| 2004/0040446 A1 * | 3/2004 | Errera | .................... | A21C 14/00 |
| | | | | 99/388 |
| 2014/0017350 A1 | 1/2014 | Myoung | | |

* cited by examiner

SPRING LOADED WAFER CUTTER

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to kitchen utensils and, more specifically, to a pastry cutter designed for efficiently cutting, perforating, and ejecting wafer cookies and similar pastries.

2. Description of the Related Art

In the field of baking, particularly in the preparation of wafer cookies and other thin pastries, the process of cutting, perforating, and handling dough can be time-consuming and labor-intensive. Traditional pastry cutters typically perform only one function-cutting the dough into desired shapes. After cutting, additional tools or manual processes are required to perforate the dough and separate the cut pieces from the surrounding excess dough. These steps often result in inefficiencies, inconsistencies, and potential damage to the delicate pastry during handling.

Existing pastry cutters and tools face several challenges. They operate on a manual multi-step process, with bakers required to use separate tools for cutting, perforating, and removing the pastry, which increases preparation time and effort. They achieve inconsistent results in that the manual handling of the dough after cutting can lead to inconsistent shapes and perforations, affecting the final product's quality. Removing cut dough pieces from the cutter without damaging them is a common problem, especially with delicate pastries like wafers. Further, dough often gets stuck in traditional cutters, making cleanup tedious and time-consuming.

These are common problems in working with any type of pastry, dough, cracker or cream that incorporates a lot of butter.

Various cookie and wafer cutting devices are known. For example:

U.S. Pat. No. 9,504,259, issued in the name of White, describes a device for cutting dough into shapes using interior and exterior cutting members, but it does not mention being spring-loaded, using interchangeable heads, having spikes, or a dough ejection mechanism.

U.S. Pat. No. 5,731,020, issued in the name of Russo, teaches pre-made wafer sheets that a consumer assembles, not a device for cutting wafers.

U.S. Pat. No. 3,828,660, issued in the name of Mueller et al., covers a machine for making ice cream cookie sandwiches. While it involves cutting cookies, the cutting mechanism is very different than the spring-loaded interchangeable head of the current invention.

Various other cookie decorating tools and presses are known, including U.S. Pat. Nos. 8,458,814, 6,386,854, and U.S. Patent Application Publication No. 2014/001350. However, none of these have the same combination of spring-loading, interchangeable shape cutting, hole punching spikes, and dough removal as the proposed invention.

U.S. Pat. No. 6,851,192, issues in the name of So, teaches a rotary design with multiple cutting moulds, but they are in a fixed arrangement rather than being interchangeable heads. It also lacks the spring-loading, spikes and ejection features.

To address the unresolve issues of existing tools, there is a need for a more efficient and integrated solution that can combine multiple functions such as perform cutting, perforating, and ejecting of the dough in a single step to streamline the baking process. Further, a need exists for consistency in shapes and perforations for each piece of pastry, ensuring uniformity in the final product. Further still, there is a need to facilitate easy removal of cut dough pieces without damaging them and that allow for easy cleaning and maintenance of the cutter is in demand.

SUMMARY OF THE INVENTION

It is an object of the invention to streamline the pastry preparation process by combining cutting, perforating, and automatic ejection functions into a single, easy-to-use tool.

It is a feature of the invention present invention to provide a pastry cutter that aims to solve these problems by integrating all necessary functions into one tool, significantly improving the efficiency, consistency, and ease of use in the preparation of wafer cookies and other similar pastries.

Briefly described according to the preferred embodiment of the present invention, a spring-loaded pastry cutter is provided designed for efficiently cutting, perforating, and ejecting wafer cookies and similar pastries. The device features a detachable head and handle, allowing the head to press into the dough to cut individual wafers while simultaneously perforating them with a grid of spikes. An internal dough pusher, aided by springs, ejects the cut wafers from the head to ensure they do not stick. Additionally, the head includes cleanout apertures for easy maintenance. This integrated tool streamlines the baking process by combining cutting, perforating, and ejecting functions into a single, ergonomic design.

It is an advantage of the present invention that it combines cutting, perforating, and ejecting functions into a single tool, reducing the need for multiple utensils.

It is an advantage of the present invention that it ensures consistent shapes and perforations for each piece of pastry, enhancing the uniformity and quality of the final product.

It is an advantage of the present invention that it allows for easy removal of cut dough pieces without damaging them, preserving the integrity of delicate pastries.

It is an advantage of the present invention that it includes cleanout apertures for quick and efficient cleaning, minimizing maintenance time.

It is an advantage of the present invention that it simplifies the pastry preparation process, making it more efficient and less labor-intensive for bakers.

It is an advantage of the present invention that it can be easily disassembled and reassembled for thorough cleaning and storage.

It is an advantage of the present invention that it is ergonomically designed, providing a comfortable grip and reducing hand fatigue during use.

It is an advantage of the present invention that it is suitable for both professional bakers and home cooks, offering versatility in various baking environments.

It is an advantage of the present invention that it enhances productivity in the kitchen by streamlining multiple tasks into one efficient process.

It is an advantage of the present invention that it reduces the risk of inconsistent results and improves the overall appearance and texture of the baked goods.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

The best mode for carrying out the invention is presented in terms of its preferred embodiment, herein depicted within the Figures.

1. Detailed Description of the Figures

Figure 1:
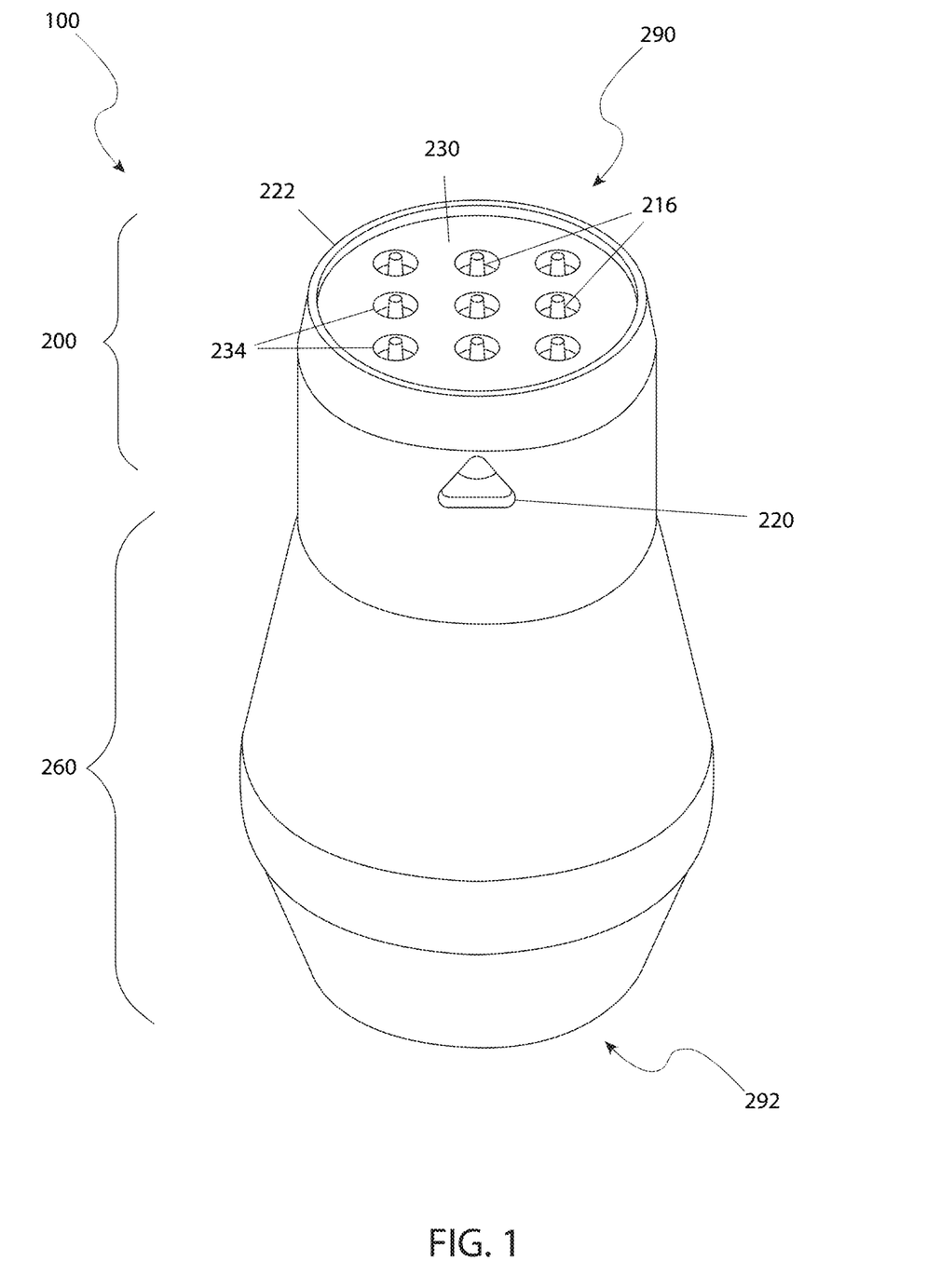
FIG. 1 is an isometric view of a pastry cutter 100, according to an embodiment of the present invention.
Figure 2:
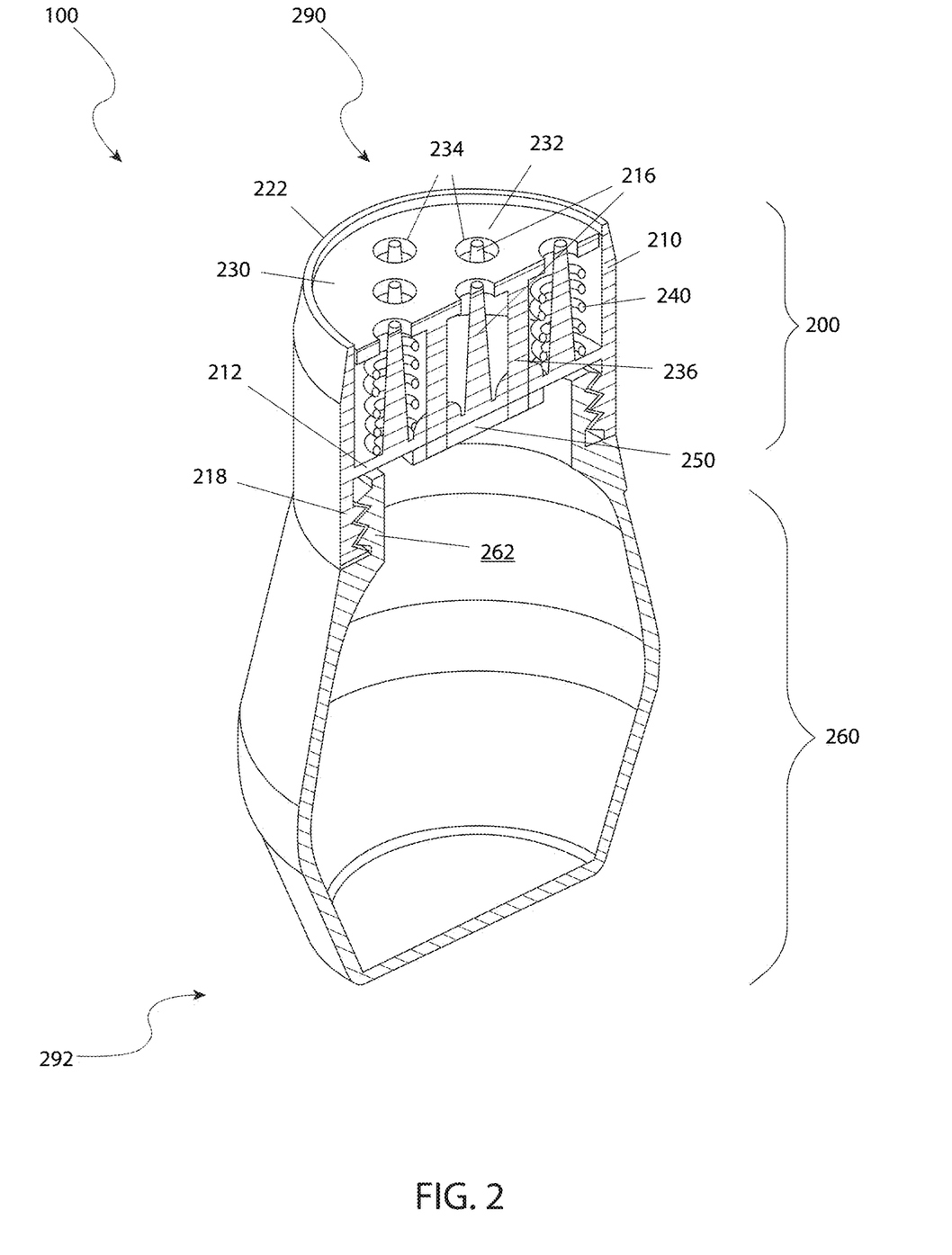
FIG. 2 is a cross-sectional view of the pastry cutter 100, according to an embodiment of the present invention.
Figure 3:
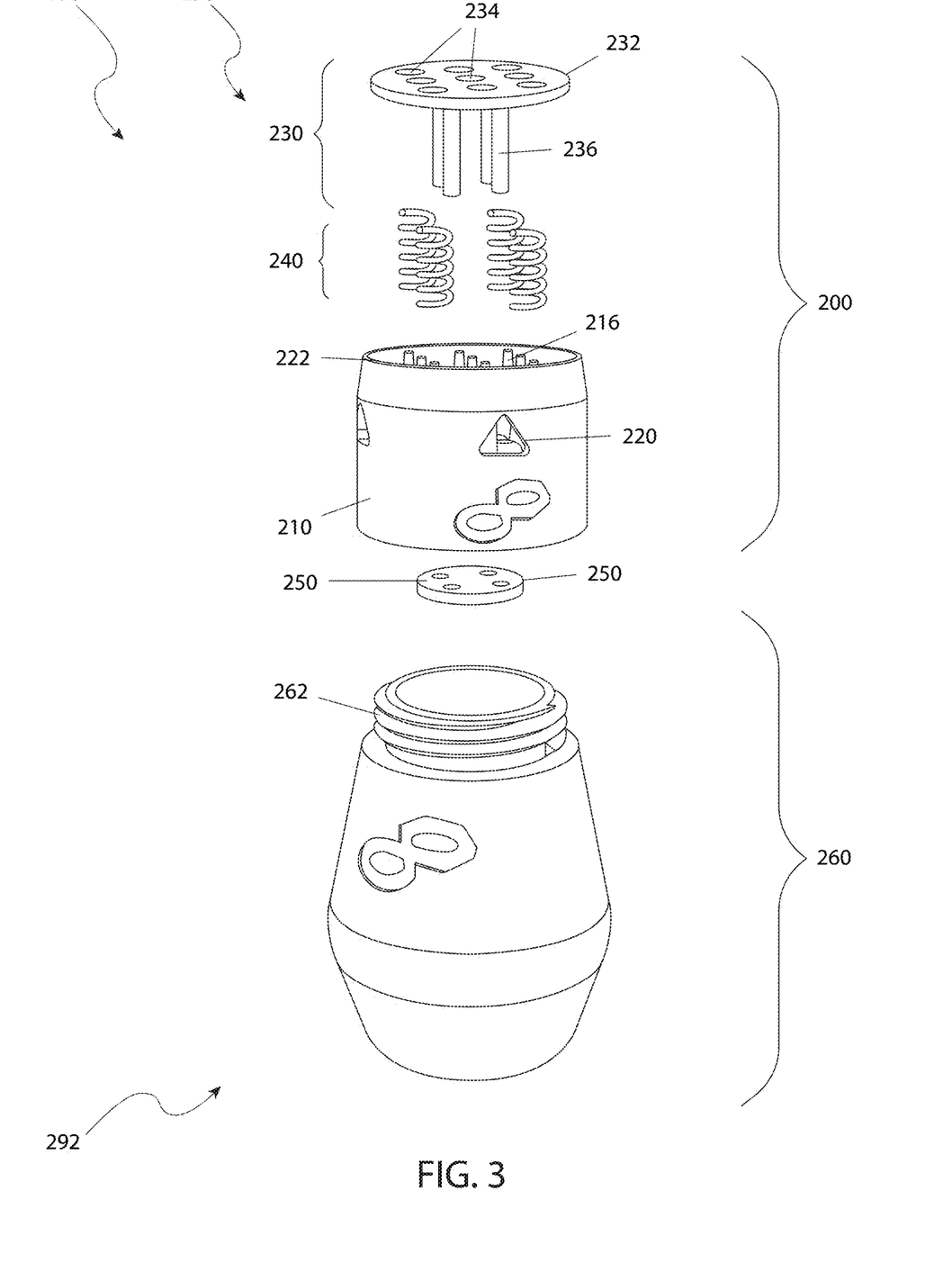
FIG. 3 is an exploded isometric view of the pastry cutter 100, according to an embodiment of the present invention.

Referring now to the drawings, wherein like reference numerals indicate the same parts throughout the several views, a pastry cutter (herein described as the "invention"), generally noted as 100, is shown according to the preferred embodiment of the present invention. The invention 100 may comprise a head 200 and a handle 260. The head 200 may detachably couple to the handle 260 to form a dough cutter. The head 200 may be pressed into rolled dough 922 to cut an individual wafer 908 for use in a wafer cookie, or for creating other types of thin and perforated pastry from rolled dough 922, such as a cracker. In the event of creating a wafer 908, the head 200 may simultaneously cut the individual wafer 908 by separating the individual wafer 908 from excess dough 924 surrounding the head 200 and may press a plurality of holes 910 into the top of the individual wafer 908. As the head 200 is lifted, a dough pusher 230 located within the head 200 may push the individual wafer 908 out of the head 200 such that the individual wafer 908 is prevented from staying in the invention 100.

Figure 5:
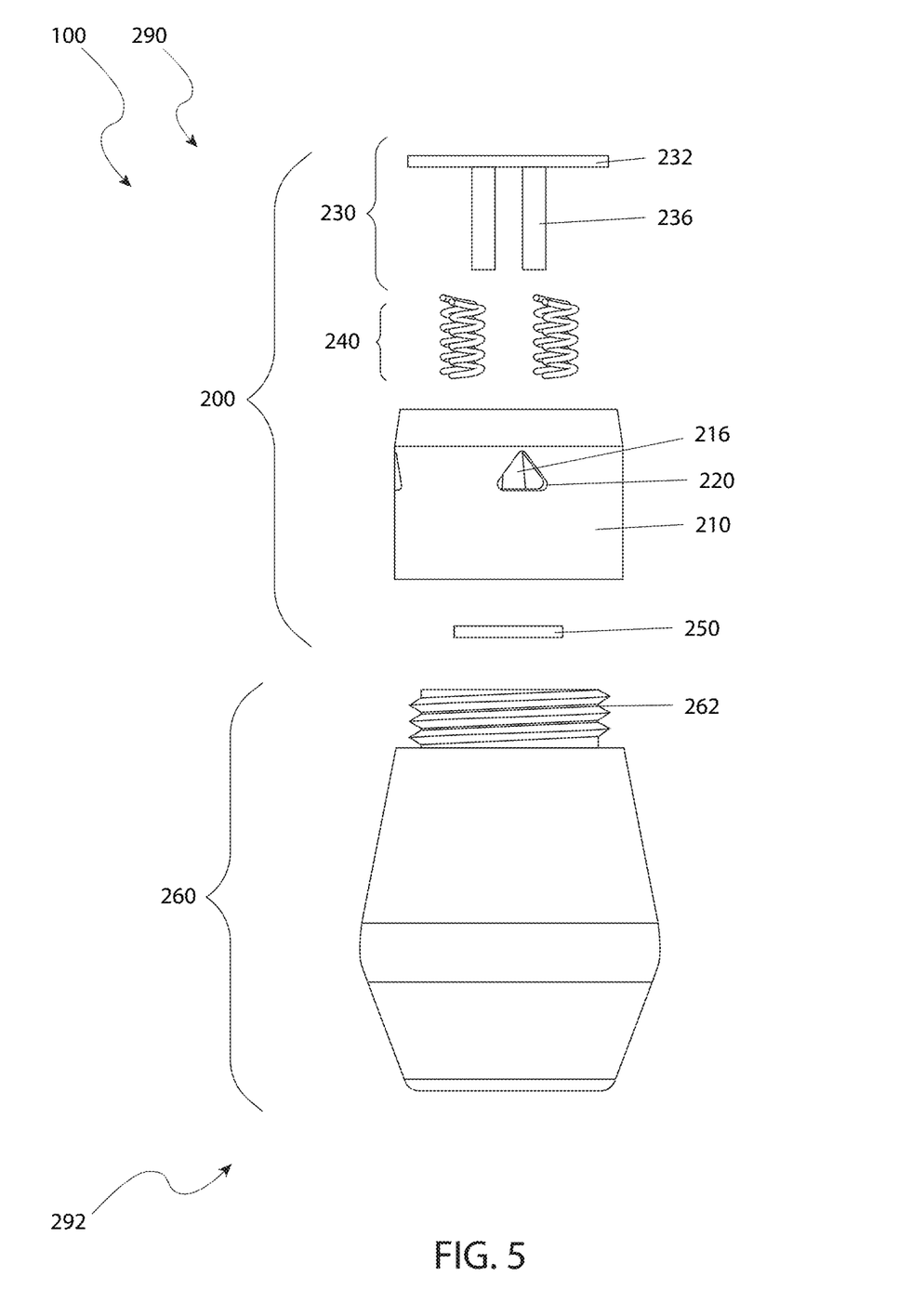
FIG. 5 is an exploded side view of the pastry cutter 100, according to an embodiment of the present invention.
Figure 6:
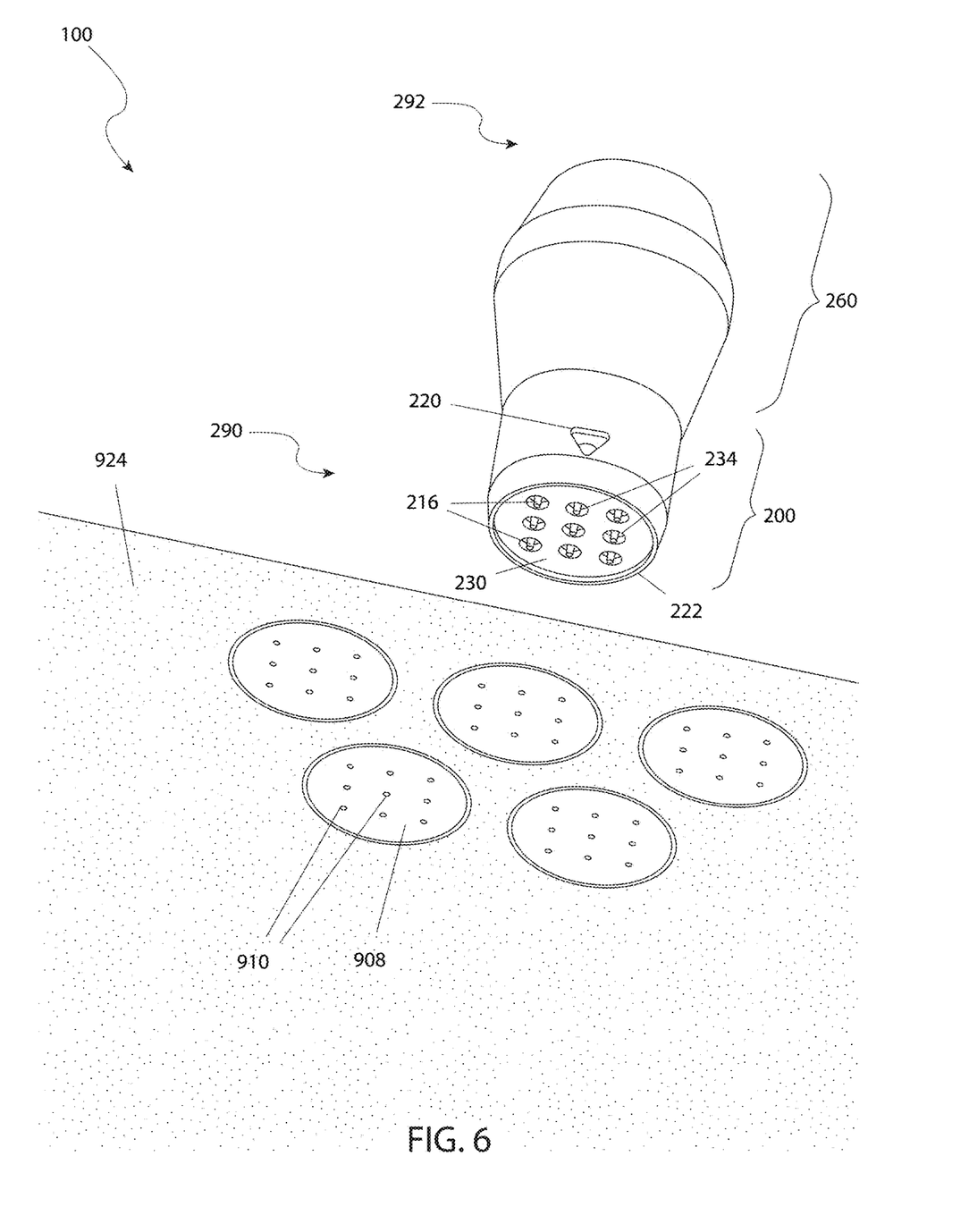
FIG. 6 is an in-use view of the pastry cutter 100, according to an embodiment of the present invention.

The head 200 may comprise a head enclosure 210, the dough pusher 230, a plurality of springs 240, and a pusher retainer 250. The head 200 may detachably couple to the handle 260 by fastening an externally threaded neck 262 of the handle 260 into an internally threaded neck 218 of the head 200.

Figure 4:
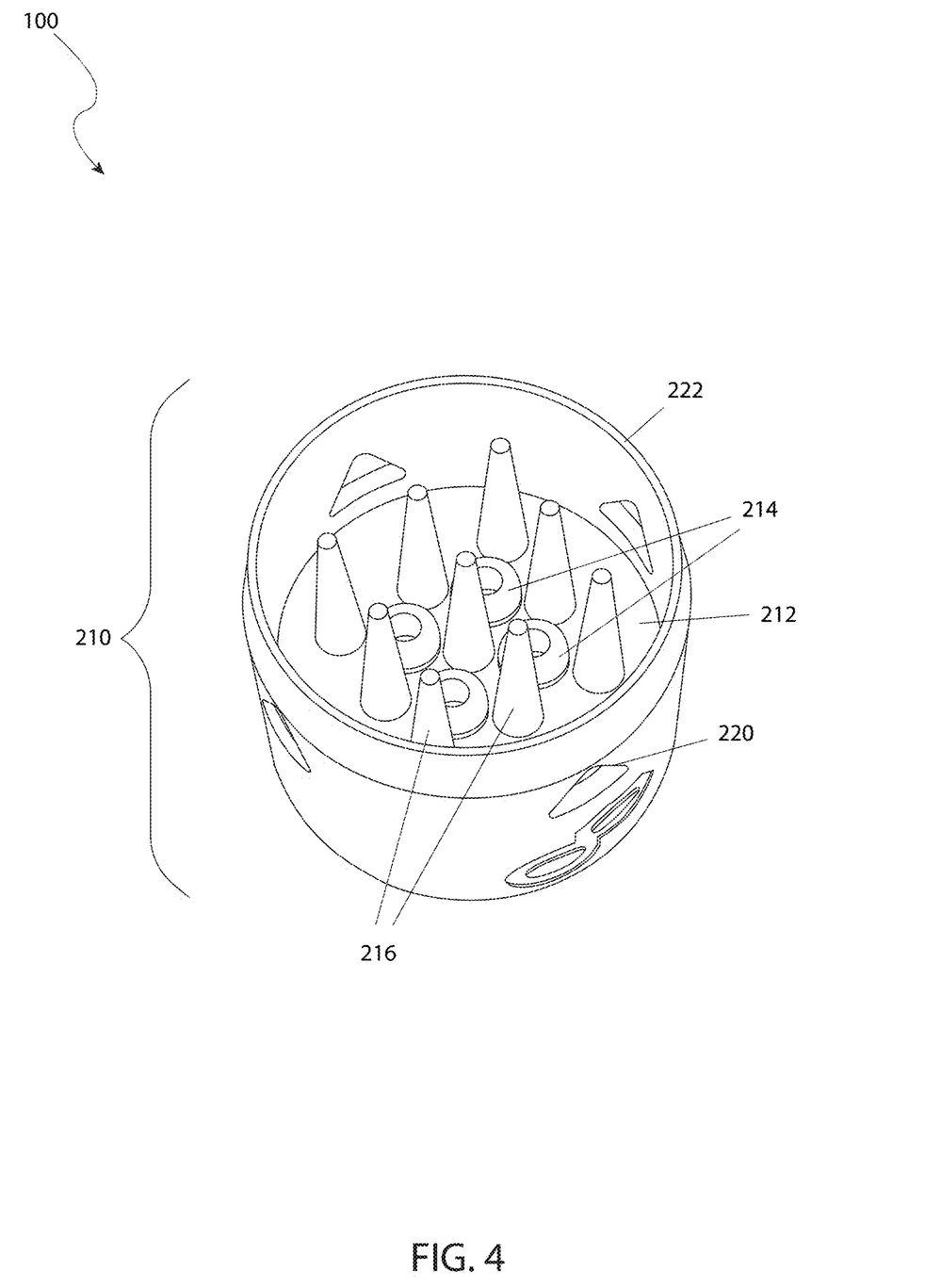
FIG. 4 is a detail view of the pastry cutter 100, according to an embodiment of the present invention, illustrating the head enclosure 210.

The head enclosure 210 may comprise a cutter edge 222 that is exposed at a distal end 290 of the head 200. The cutter edge 222 may separate the individual wafer 908 from the excess dough 924 surrounding the head 200 by slicing down into the rolled dough 922. The cutter edge 222 may define the shape of the individual wafer 908.

The head enclosure 210 may comprise a spring backer 212. The spring backer 212 may be a laterally oriented barrier that may be coupled to the side wall of the head enclosure 210. The plurality of springs 240 located within the head 200 may push against the spring backer 212 in order to compress the plurality of springs 240 between the dough pusher 230 and the spring backer 212. The spring backer 212 may comprise a plurality of first pusher rod apertures 214 such that a plurality of pusher rods 236 on the dough pusher 230 may pass through the spring backer 212.

A plurality of spikes 216 may project in a distal direction from the distal side of the spring backer 212. The plurality of spikes 216 may be operable to pierce the individual wafer 908 such that the plurality of spikes 216 form the plurality of holes 910 in the individual wafer 908 as the individual wafer 908 is cut from the rolled dough 922. The plurality of spikes 216 may extend as far as the plane of the cutter edge 222 but no farther.

The head enclosure 210 may comprise a plurality of cleanout apertures 220. The plurality of cleanout apertures 220 may be openings in the side wall of the head enclosure 210. The plurality of cleanout apertures 220 may be used while cleaning dough from within the head 200. As a non-limiting example, hot water may be directed through the head 200 via the plurality of cleanout apertures 220 and/or the dough caught within the head 200 may be removed from the head 200 using a skewer poked into the plurality of cleanout apertures 220.

The dough pusher 230 may comprise a pusher plate 232 and the plurality of pusher rods 236. The dough pusher 230 may be located inside of the distal end 290 of the head 200. The plurality of pusher rods 236 may extend in a proximal direction from the proximal side of the pusher plate 232. The plurality of pusher rods 236 may pass through the spring backer 212. The plurality of springs 240 may be located between the pusher plate 232 and the spring backer 212 and may encircle one (1) or more of the plurality of pusher rods 236, one (1) or more of the plurality of spikes 216, or any combination thereof.

Figure 7A:
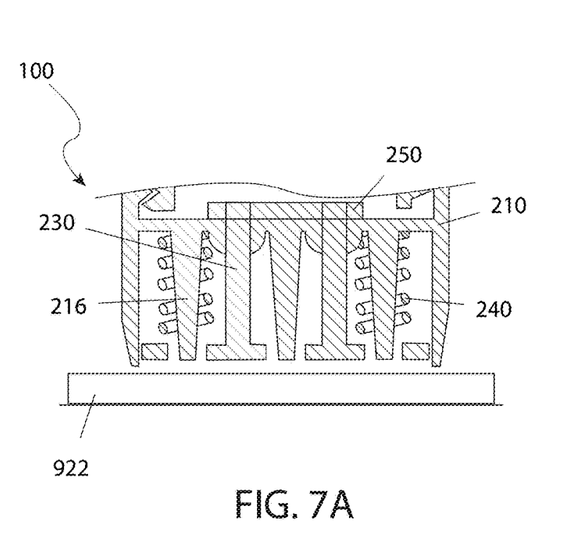
FIG. 7A is a side detail view of the pastry cutter 100, according to an embodiment of the present invention, illustrating the head enclosure 210 in position on top of the rolled dough 922.
Figure 7B:
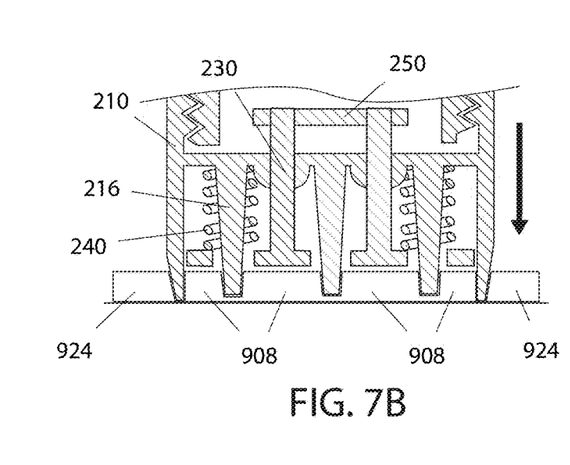
FIG. 7B is a side detail view of the pastry cutter 100, according to an embodiment of the present invention, illustrating the head enclosure 210 pressed into the dough 922 to separate an individual wafer 908 from the surrounding excess dough 924 and illustrating upward displacement of the dough pusher 230 and the pusher retainer 260.
Figure 7C:
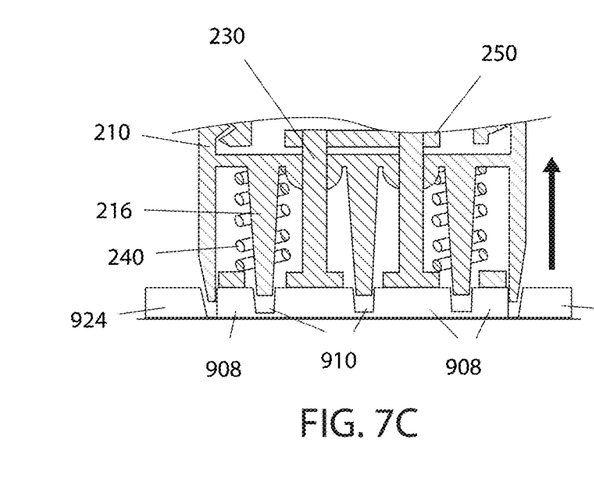
FIG. 7C is a side detail view of the pastry cutter 100, according to an embodiment of the present invention, illustrating the head enclosure 210 being lifted and illustrating the dough pusher 230 forcing the individual wafer 908 tout of the head enclosure 210 due to force applied by the plurality of springs 240.

The pusher plate 232 may press against the rolled dough 922 while cutting the individual wafer 908. The rolled dough 922 may push the pusher plate 232 towards a proximal end 292 of the head 200 while cutting the individual wafer 908. The plurality of springs 240 may push the pusher plate 232 back in the distal direction as the head 200 is lifted from the rolled dough 922, thus ejecting the individual wafer 908 from the head 200.

The pusher plate 232 may comprise a plurality of spike apertures 234 such that the plurality of spikes 216 coupled to the spring backer 212 may extend through the pusher plate 232 and into the rolled dough 922. The layout and spacing of the plurality of spike apertures 234 may match the layout and spacing of the plurality of spikes 216.

The pusher retainer 250 may be located on the proximal side of the spring backer 212, opposite the pusher plate 232. The pusher retainer 250 may comprise a plurality of second pusher rod apertures 252. The pusher retainer 250 may be coupled to the dough pusher 230 by coupling the plurality of pusher rods 236 to the pusher retainer 250 at the plurality of second pusher rod apertures 252. The pusher retainer 250 may be operable to limit the distance that the dough pusher 230 may move in the distal direction. The layout and spacing of the plurality of second pusher rod apertures 252 on the pusher retainer 250 may match the layout and spacing of the plurality of pusher rods 236 and the layout and spacing of the plurality of first pusher rod apertures 214 on the spring backer 212.

The handle 260 may detachably couple to the head 200. The handle 260 may be adapted for a user to grasp. The handle 260 may generally be a bulbous shape and may be adapted to conform to the contours of a hand.

In a preferred embodiment, the shape of the cutter edge 222 may be circular such that the cutter edge 222 cuts a round wafer 908.

In the preferred embodiment, there may be nine (9) spikes 216 on the spring backer 212 and nine (9) spike apertures 234 in the pusher plate 232 of the dough pusher 230. The nine (9) spikes 216 and the nine (9) spike apertures 234 may be laid out as a three-by-three (3×3) square grid.

In the preferred embodiment, there may be four (4) pusher rods 236 on the dough pusher 230, four (4) first pusher rod apertures 214 on the spring backer 212, four (4) second pusher rod apertures 252 on the pusher retainer 250, and four (4) springs. The four (4) pusher rods 236, the four (4) first pusher rod apertures 214, and the four (4) second pusher rod apertures 252 may be laid out as a two-by-two (2×2) square grid.

2. Operation of the Preferred Embodiment

In use, the invention 100 may be used to cut dough 922 into individual wafers 908 used to make a cream wafer cookie, or alternately to be used to cut into crackers or other similar thin and perforated pastry. As a non-limiting example, the dough 922 may be rolled out on a sheet pan and a plurality of the individual wafers 908 may be cut by repeatedly pressing the head 200 of the dough cutter into the rolled dough 922. Each time that the dough cutter is pressed into the rolled dough 922, the head 200 may create one (1) of the individual wafers 908 by separating the individual wafer 908 from the excess dough 924 surrounding the head 200, by pressing the plurality of spikes 216 into the individual wafer 908 to create a plurality of holes 910 in the individual wafer 908, and by ejecting the individual wafer 908 from the head 200 such that the individual wafer 908 remains on the sheet pan. The excess dough 924 may be removed from the sheet pan, a plurality of cut-out wafers 908 on the sheet pan may be baked, and the individual wafers 908 may be removed from the sheet pan. Two (2) wafers 908 may be used to make a cream wafer cookie by placing filling between the individual wafers 908.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Provisional Patent Application.

The invention claimed is:

1. A pastry cutter comprising:
   a head, including:
   a head enclosure with a cutter edge at a distal end for cutting dough;
   a plurality of spikes for perforating the dough; and
   a plurality of cleanout apertures for maintenance;
   a dough pusher within the head, comprising:
   a pusher plate;
   a plurality of pusher rods extending from the pusher plate; and
   a plurality of springs encircling the pusher rods;
   a pusher retainer positioned within the head, aligned with the pusher rods; and
   a handle detachably coupled to the head.

2. The pastry cutter of claim 1, wherein the head enclosure further comprises a spring backer for compressing the plurality of springs between the dough pusher and the spring backer.

3. The pastry cutter of claim 1, wherein the cutter edge defines a circular shape for cutting round wafers.

4. The pastry cutter of claim 1, wherein the spikes extend to the plane of the cutter edge but no farther.

5. The pastry cutter of claim 1, wherein the dough pusher further comprises a plurality of spike apertures matching the layout and spacing of the plurality of spikes.

6. The pastry cutter of claim 1, wherein the handle comprises an externally threaded neck for coupling to an internally threaded neck of the head.

7. The pastry cutter of claim 1, wherein the cleanout apertures are positioned on the side wall of the head enclosure for facilitating cleaning.

8. The pastry cutter of claim 1, wherein the springs are positioned to push the dough pusher back in the distal direction as the head is lifted from the dough, ejecting a cut wafer from the head.

9. The pastry cutter of claim 1, wherein the handle is adapted to conform to contours of a user's hand.

10. The pastry cutter of claim 1, wherein the head, dough pusher, pusher retainer, and handle are detachable for easy cleaning and storage.

11. The pastry cutter of claim 1, wherein the head enclosure and dough pusher are made from food-grade materials suitable for kitchen use.

12. The pastry cutter of claim 1, wherein the spikes are arranged in a grid pattern for uniform perforation of the dough.

13. The pastry cutter of claim 1, wherein the cutter edge and spikes create uniform, consistent shapes and perforations in the dough.

14. The pastry cutter of claim 1, wherein the pusher retainer limits the distance the dough pusher can move in the distal direction, ensuring proper ejection of a wafer.

15. The pastry cutter of claim 1, wherein the head enclosure includes a plurality of first pusher rod apertures to guide the movement of the pusher rods through a spring backer.

* * * * *